United States Patent
Ripley (10) Patent No.: US 10,863,443 B2
(45) Date of Patent: Dec. 8, 2020

(54) DIPLEXED COUPLER FOR CARRIER AGGREGATION

(71) Applicant: Skyworks Solutions, Inc., Woburn, MA (US)

(72) Inventor: David Steven Ripley, Marion, IA (US)

(73) Assignee: Skyworks Solutions, Inc., Irvine, CA (US)

( * ) Notice: Subject to any disclaimer, the term of this patent is extended or adjusted under 35 U.S.C. 154(b) by 50 days.

(21) Appl. No.: 16/211,970

(22) Filed: Dec. 6, 2018

(65) Prior Publication Data

US 2019/0215774 A1   Jul. 11, 2019

Related U.S. Application Data

(63) Continuation of application No. 15/280,702, filed on Sep. 29, 2016, now Pat. No. 10,182,403.

(60) Provisional application No. 62/234,813, filed on Sep. 30, 2015.

(51) Int. Cl.
| | |
|---|---|
| *H04L 12/26* | (2006.01) |
| *H04W 52/04* | (2009.01) |
| *H04W 52/34* | (2009.01) |
| *H04B 17/10* | (2015.01) |

(52) U.S. Cl.
CPC .......... *H04W 52/04* (2013.01); *H04B 17/101* (2015.01); *H04W 52/346* (2013.01); *H04B 17/102* (2015.01); *H04B 17/103* (2015.01)

(58) Field of Classification Search
None
See application file for complete search history.

(56) References Cited

U.S. PATENT DOCUMENTS

| | | | |
|---|---|---|---|
| 10,396,887 B2* | 8/2019 | Bennett | H04L 5/14 |
| 2004/0198237 A1 | 10/2004 | Abutaleb et al. | |
| 2008/0004078 A1 | 1/2008 | Barratt et al. | |
| 2009/0227214 A1 | 9/2009 | Georgantas et al. | |
| 2011/0007675 A1* | 1/2011 | Chiou | H04B 1/44 |
| | | | 370/297 |
| 2011/0116423 A1* | 5/2011 | Rousu | H01Q 1/521 |
| | | | 370/297 |
| 2011/0281543 A1 | 11/2011 | White et al. | |
| 2013/0230083 A1 | 9/2013 | Behzad | |
| 2013/0336181 A1 | 12/2013 | Khlat et al. | |

(Continued)

*Primary Examiner* — Phirin Sam
(74) *Attorney, Agent, or Firm* — Knobbe Martens Olson & Bear, LLP (57) ABSTRACT

A wireless device is disclosed that can support carrier aggregation uplink ("CAUL") communication using a single wideband coupler. A single wideband coupler that can operate or support some or all of the communication bands of the wireless device can be used in conjunction with one or more diplexers and/or filters to measure the power of individual communication bands involved in the transmission process. Further, the use of a wideband coupler and switching network to measure the transmit power from the one or more transmit paths or main paths of a wireless device can reduce the size of a transceiver and reduce the insertion loss attributed to the power measurement components compared to systems that use separate measurement systems for each transmit path. The power measurement system may occur in a separate path in electrical connection with the wideband coupler, which may therefore be termed a coupler path.

20 Claims, 7 Drawing Sheets

(56) References Cited

U.S. PATENT DOCUMENTS

| | | |
|---|---|---|
| 2015/0124661 A1 | 5/2015 | He et al. |
| 2015/0156777 A1 | 6/2015 | Negus et al. |
| 2015/0288467 A1* | 10/2015 | Kahrizi ............... H04L 5/001 370/241 |
| 2015/0333781 A1 | 11/2015 | Alon et al. |
| 2016/0013855 A1 | 1/2016 | Campos et al. |
| 2016/0050667 A1 | 2/2016 | Papasakellariou et al. |
| 2016/0079649 A1* | 3/2016 | Ilkov ............... H04B 1/0458 343/853 |
| 2016/0119003 A1* | 4/2016 | Granger-Jones ....... H04L 5/001 370/276 |
| 2016/0285505 A1 | 9/2016 | Lee et al. |
| 2017/0094607 A1 | 3/2017 | Ripley |
| 2017/0187414 A1 | 6/2017 | Talty et al. |
| 2020/0153511 A1* | 5/2020 | Henry ............... H02J 13/00017 |

\* cited by examiner

DIPLEXED COUPLER FOR CARRIER AGGREGATION

RELATED APPLICATION

This application claims priority to U.S. application Ser. No. 15/280,702, which was filed on Sep. 29, 2016 and is titled "DIPLEXED COUPLER FOR CARRIER AGGREGATION," the disclosure of which is expressly incorporated by reference herein in its entirety for all purposes, and which claims priority to U.S. Provisional Application No. 62/234,813, which was filed on Sep. 30, 2015 and is titled "DIPLEXED COUPLER FOR CARRIER AGGREGATION," the disclosure of which is expressly incorporated by reference herein in its entirety for all purposes.

BACKGROUND

Technical Field

This disclosure relates to carrier aggregation and, in particular, to processing received multiband signals.

Description of Related Technology

Often, wireless communication involves sending and receiving signals along a particular communication band. However, in some cases, wireless communication may involve the use of multiple communication bands, which is sometimes referred to as multiband communication and may involve multiband signal processing. Usually, when a wireless device receives a multiband signal, the wireless device will perform carrier aggregation to aggregate the constituent signals. This can result in a wider bandwidth and it can be possible to receive data or communication signals at a higher data rate.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to an antenna switch module. The antenna switch module may include a transmit switch in communication with a plurality of transmit paths. At least one of the transmit paths may support carrier aggregation transmission of a first radio frequency band and a second radio frequency band. Further, the antenna switch module may include a coupler including at least a first port and a second port. The first port may be in communication with the transmit switch and the second port may be in communication with an antenna. The coupler may be configured to provide a transmit signal from the transmit switch to the antenna. Moreover, the antenna switch module may include a power measurement module in communication with the coupler. The power measurement module may be part of a coupled path that is separate from the plurality of transmit paths.

In certain embodiments, the power measurement module does not contribute to an insertion loss within the plurality of transmit paths. Some implementations of the power measurement module include a first switch and a second switch. The first switch may be configured to switch between connecting a third port of the coupler to a third switch and a fourth port of the coupler to the third switch. Further, the second switch may be configured to switch between connecting the third port of the coupler to a termination resistor and the fourth port of the coupler to the termination resistor. In some implementations, the third port of the coupler is connected to the third switch when the fourth port of the coupler is connected to the termination resistor, and the third port of the coupler is connected to the termination resistor when the fourth port of the coupler is connected to the third switch.

Some implementations of the power measurement module further include the third switch and a diplexer in communication with the third switch. The third switch may be configured to switch between connecting one of the third port of the coupler or the fourth port of the coupler to one of the diplexer or a common coupler output. In some cases, the common coupler output corresponds to a power measurement for a third RF band. This third RF band may be a band that is not used for carrier aggregation transmission. Further, the diplexer may be configured to multiplex a first signal corresponding to the first RF band and a second signal corresponding to the second RF band. Moreover, the diplexer may be configured to output a first power measurement corresponding to the first RF band and a second power measurement corresponding to the second RF band.

In some designs, the power measurement module further includes a low pass filter, a high pass filter, and the third switch. The third switch may be a single pole three throw switch. The first throw may be configured to connect the first switch to the low pass filter. The second throw may be configured to connect the first switch to the high pass filter. The third throw may be configured to connect the first switch to a common coupler output without a filter. Further, the power measurement module may include the coupler.

Certain aspects of the present disclosure relate to a transceiver. The transceiver may include a power amplifier module that includes a plurality of power amplifiers. Each power amplifier from the plurality of power amplifiers may correspond to a different radio frequency band. Further, the transceiver may include an antenna switch module in communication with the power amplifier module. The antenna switch module may include a band selection switch, a coupler, and a power measurement module. The band selection switch may be in communication with a plurality of band paths. At least one of the band paths may support carrier aggregation transmission of a first RF band and a second RF band. The coupler may include a first port and a second port. The first port may be in communication with the band selection switch and the second port may be in communication with an antenna. Further, the coupler may be configured to provide a transmit signal from the band selection switch to the antenna. Moreover, the power measurement module may be in communication with the coupler. In some cases, the power measurement module may be part of a coupled path that is separate from the plurality of band paths.

In certain embodiments, the power measurement module includes a plurality of switches configured to regulate the providing of a power measurement from the coupler to at least one of the plurality of power amplifiers. Further, the power measurement may correspond to one of an output power at the antenna or a reflected power from the antenna. In some implementations, the power measurement module further includes a first diplexer in communication with one of the plurality of switches. The first diplexer may be configured to multiplex a first signal corresponding to the first RF band and a second signal corresponding to the second RF band.

Moreover, the transceiver may further comprise a second diplexer. The second diplexer may be in communication with a first power amplifier and a second power amplifier from the plurality of power amplifiers. The first power amplifier may correspond to the first RF band and the second power amplifier may correspond to the second RF band. Further, the second diplexer may be configured to multiplex a third signal corresponding to the first RF band and a fourth signal corresponding to the second RF band. In some cases, the first signal and the third signal are the same frequency and the first signal has a different power level than the third signal. Moreover, in some cases, the second signal and the fourth signal are the same frequency and the second signal has a different power level than the fourth signal. Further, in some cases, the second diplexer generates a 1-2 dB insertion loss and the first diplexer generates a 2-5 dB insertion loss. In certain embodiments, the power amplifier module is configured to modify the input power to at least one power amplifier from the plurality of power amplifiers based at least in part on a power measurement signal from the power measurement module.

Certain aspects of the present disclosure relate to a wireless device. The wireless device may include an antenna configured to receive and transmit a wireless signal. The antenna may be capable of transmitting a carrier aggregation signal. The wireless device may further include a transceiver in communication with the antenna. The transceiver may include a power amplifier module and an antenna switch module in communication with the antenna and the power amplifier module. Further, the antenna switch module may include a band selection switch, a coupler, and a power measurement module. The band selection switch may be in communication with a plurality of band paths. At least one of the band paths may support transmission of a carrier aggregation signal including at least a first signal of a first RF band and a second signal of a second RF band. The coupler may be configured to provide a transmit signal from the band selection switch to the antenna. Further, the power measurement module may be part of a coupled path that is separate from the plurality of band paths.

DETAILED DESCRIPTION

Introduction

Some wireless devices support communication over multiple radio frequency (RF) bands. In some cases, a wireless device may communicate over multiple frequency or RF bands at the same time. Communicating over multiple frequency bands may include a wireless device transmitting data and/or voice (e.g., audio data) synchronously over multiple communication bands. This synchronous or simultaneous transmission over multiple RF bands may be referred to as uplink carrier aggregation or carrier aggregation uplink ("CAUL"). Using CAUL may enable transmission at higher data rates because, for example, each carrier may transmit some of the data. Thus, for example, in some cases, instead of a single carrier transmitting data at rate X, two carriers can transmit data together at a rate of up to 2X. Devices that are capable of CAUL typically include at least two power amplifiers transmitting signals at the same time. The signals may be combined and transmitted together over a single communication connection using, for example, time division duplex (TDD) communication, which can communicate both carriers together over a single uplink connection.

There is often a need to monitor the power output by the power amplifiers involved in the transmission process or within the transmission lines or paths between the power amplifier(s) and the antenna(s) in the wireless device. For example, it may be desirable to sense the output power of the wireless device so that the input power to one or more of the power amplifiers can be adjusted so as to maintain a constant or relatively constant (e.g., within a threshold power variation) at the antenna(s). The power output at an antenna may vary due to a number of factors, such as distance from a base station, positioning of a user's hand, or the physical environment around the wireless device (e.g., placed on a metal table or a wooden table, etc.). As another example of, it may be desirable to sense the output power of the wireless device to determine whether the device is operating within a target specific absorption rate (SAR) range or below a SAR threshold. The SAR for a wireless device is usually related to a safety parameter for the amount of radiation or RF energy permitted by a regulatory agency or other government agency to be emitted with in a particular distance range of a user.

One method of monitoring the power output of a power amplifier and/or the power to be output by an antenna is to place a coupler on the transmission line or output path between the power amplifier and the antenna. This coupler may be used to provide a portion of the transmit power along the transmit path within the wireless device to a feedback system that can be used to determine the amount of the transmit power being provided to the antenna for output. For wireless devices with single band transmission or for wireless devices with multiple band transmission that transmit from a single band at a time (e.g., with a single active transmitter), this coupler can be used to measure the transmit output power for each transmit band.

However, a wireless device that supports CAUL will generally combine the output of multiple power amplifiers along a single transmit path within the wireless device for transmission in a single communication connection. Thus, in such cases, the wireless device may include multiple couplers. A coupler may be placed subsequent to each power amplifier that corresponds to a communication band used in CAUL by the wireless device. These couplers are generally positioned before the transmit path for each of the CAUL supporting power amplifiers are combined into a single transmit path. Furthermore, each of the couplers may be designed to support a particular communication band associated with the power amplifier. Thus, each coupler may be designed and configured uniquely, thereby reducing the ability to swap or share coupler designs among the transmit paths in the manufacturing process and increasing the resources required to design and manufacture the wireless device. Further, adding couplers to the transmit path may increase the size of the transmitter die or module and typically also adds insertion loss to the transmit path. As a result, the strength of the transmit signal may be reduced or more power may be required by the transmitter to maintain output signal strength resulting in an increased battery drain. Some wireless devices can support 10, 12, or more transmit bands and thus, the number of couplers may be 10, 12 or more compounding the problems described above.

Certain embodiments described herein enable a wireless device to support CAUL while using a single wideband coupler. Often, the communication bands supported by a wireless device are separated by 100 MHz or more. In some cases, less separation may exist between some of the communication bands of a wireless device, but the communication bands used for CAUL are separated by at least 100 MHz. Thus, a single wideband coupler that can operate or support some or all of the communication bands of the wireless device can be used in conjunction with one or more diplexers and/or filters to measure the power of individual communication bands involved in the transmission process. Further, certain embodiments described herein can remove components used in the measurement of the transmit power from the one or more transmit paths or main paths of a wireless device reducing the insertion loss attributed to the power measurement components. Instead, the power measurement may occur in a separate path in electrical connection with the wideband coupler, which may therefore be termed a coupler path.

First Example Wireless Device

Figure 1:
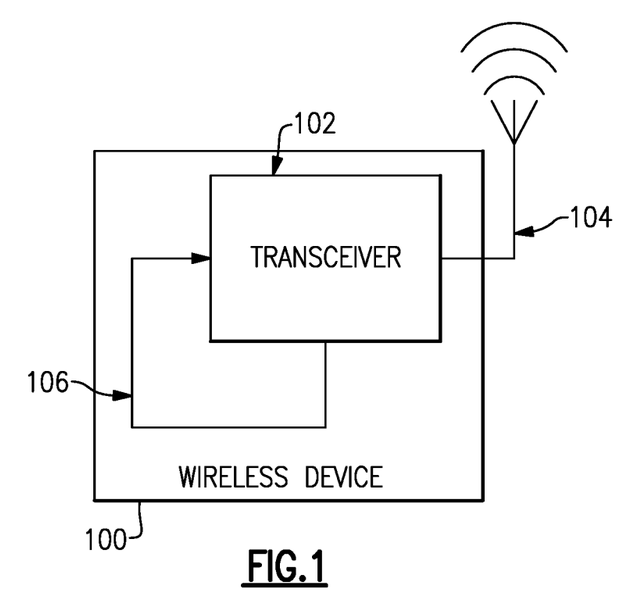
FIG. 1 illustrates a block diagram of an embodiment of a wireless device that includes a transceiver.

FIG. 1 illustrates a block diagram of an embodiment of a wireless device 100 that includes a transceiver 102. The transceiver 102 may include a feedback loop 106 that enables the transceiver 102 to measure or determine power provided to the antenna 104 for output. Using this measured power value, the transceiver 102 can adjust power input to power amplifiers of the transceiver 102. Embodiments of the transceiver 102 are described in more detail below with respect to FIG. 2.

Although the feedback loop 106 is illustrated as providing an output of the transceiver 102 back to the transceiver 102 is an input, in some cases the feedback loop 106 may be internal to the transceiver 102. In other words, components or devices within the transceiver 102 may feedback information to other components within the transceiver 102 to measure a power value and/or to act on a measurement of the power value. Further, it should be understood that the transceiver 102 may be a transmitter. In some such cases, the wireless device 100 may include a separate receiver.

Example Transceiver

Figure 2:
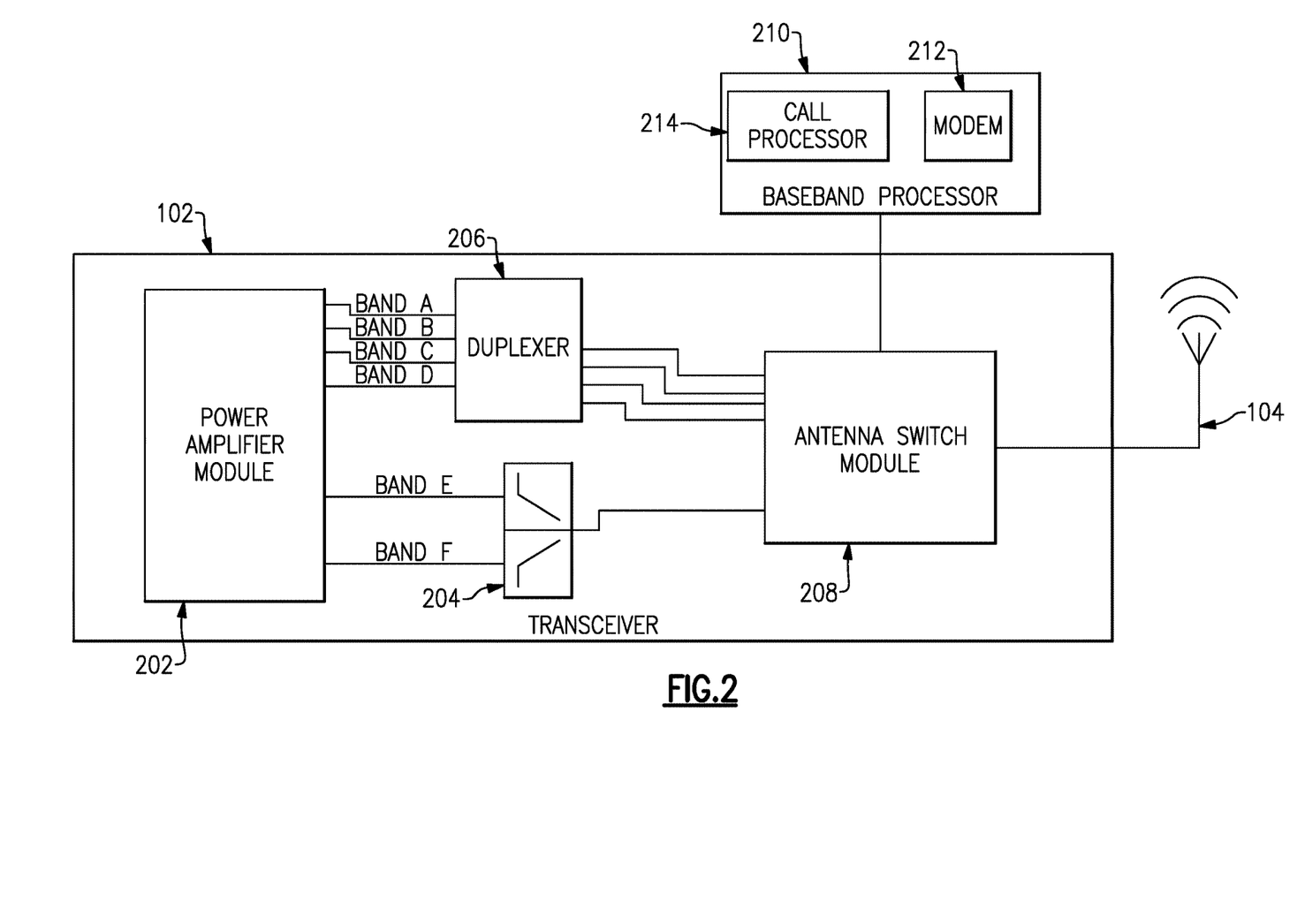
FIG. 2 illustrates a block diagram of an embodiment of the transceiver of FIG. 1.

FIG. 2 illustrates a block diagram of an embodiment of the transceiver 102 of FIG. 1. The transceiver 102 includes a power amplifier module 202, a diplexer 204, a duplexer 206 or a duplex filter bank 206, and an antenna switch module 208. In some cases, the duplex filter bank 206 may include a bank or set of filters that support multiple frequency bands. The power amplifier module 202 generally includes a plurality of power amplifiers. Further the power amplifier module 202 may include a controller that controls the operation of the power amplifiers. This controller may activate or deactivate one or more of the power amplifiers. Further, the power amplifier module 202 and/or its controller may include bias circuitry for biasing the plurality of power amplifiers and power control circuitry for controlling the input power provided to a plurality of power amplifiers.

As illustrated in FIG. 2, the power amplifier module 202 may include a number of output paths. Each of these output paths may be associated with a different power amplifier of the power amplifier module 202. Further, each of the output paths may be associated with a different communication band or transmit band. For example, as illustrated in FIG. 2, the power amplifier module 202 has six outputs corresponding, in order from top to bottom, to band A, band B, band C, band D, band E, and band F.

The transceiver 102 in this particular example may be capable of CAUL communication with respect to bands E and F. Thus, the transmit paths for band E and band F that extend from the power amplifier module 202 may be combined into a single transmit path by, for example, the diplexer 204. The diplexer 204 may implement frequency domain multiplexing to combine the band E signal in the band F signal into a single transmit signal. Typically, band E and band F are made up of disjoint frequencies enabling the two signals to be combined without interfering with each other. Thus, both the band E signal and the band F signal can share the same communication channel.

Although only two communication bands are illustrated as being combined, in some embodiments more than two communication bands may be combined by a diplexer into a single communication channel. Further, although only one CAUL communication channel is illustrated, the transceiver 102 may include multiple CAUL channels. In other words, in some cases, multiple sets of communication bands may be combined to perform carrier aggregation transmission.

The duplex filter bank 206 enables one or more of the communication bands to be used for both transmitting a signal and receiving a signal. The duplex filter bank 206 can direct a signal received from the antenna switch module 208 to a receiver (not shown) included in the transceiver 102. In some cases, the duplex filter bank 206 may be omitted. For example, the transceiver 102 may instead be a transmitter that is separate from a receiver. In some such cases, the duplex filter bank 206 may be unnecessary. Although there is no duplexer, or duplex filter bank, illustrated with respect to the aggregated communication bands E and F, in some cases the communication channel associated with bands E and F may also include a duplexer enabling the transceiver 102 to receive band E and/or F signals.

In some embodiments, a signal may be transmitted on one of band E or band F while no signal is transmitted on the other band. Further, typically only one transmit path corresponding to one communication band, or one aggregated transmit path corresponding to one set of aggregated communication bands, transmits a signal or is active at a time. The antenna switch module 208 may control which transmit path is provided to the antenna 104.

The antenna switch module 208 may be controlled by a baseband processor 210. The baseband processor 210 may provide a control signal to the antenna switch module 208 to select a transmit path to transmit a signal. Further, the selection of the transmit path may be based on a selection of a communication band identified by a base station for receiving signals from the wireless device 100.

The baseband processor 210 includes a call processor 214 and a model 212. The modem can perform modulation and demodulation of data and voice for transmission. The call processor 214 may control the timing of communication with the base station. Further, the call processor 214 may control the switches of the antenna switch module 208. In some embodiments, the call processor 214 may also control the power amplifiers of the power amplifier module 202.

Example Transceiver Signal Paths

Figure 3A:
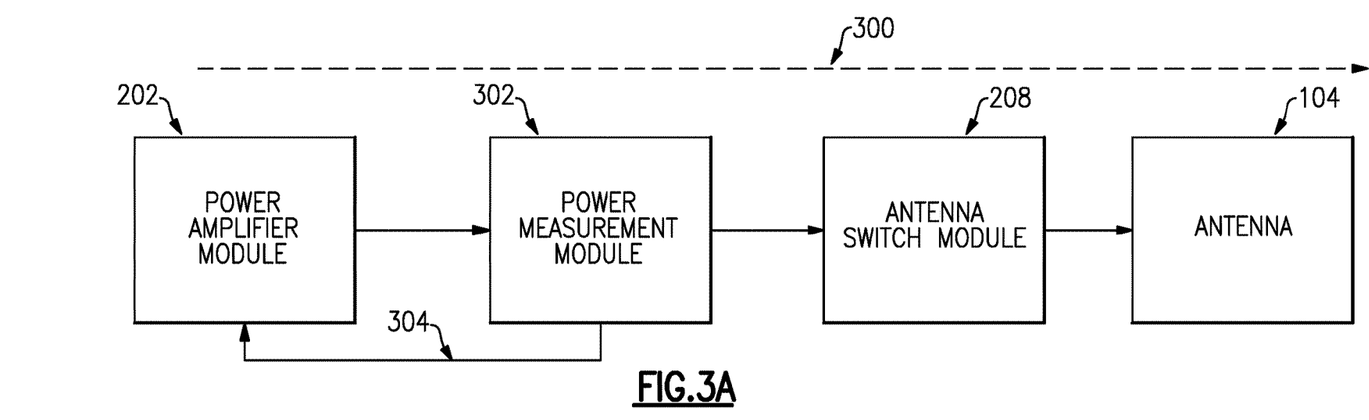
FIG. 3A illustrates one embodiment of a transmitter signal path including a power measurement module.

FIG. 3A illustrates one embodiment of a transmitter signal path 300 including a power measurement module 304. As previously described, there are a number of reasons why it is beneficial to monitor the output or transmit power for transmission of the signal. Thus, some wireless devices may include a power measurement module 302 within the transmission or transceiver signal path 300.

In some implementations of a device's transmission path, the power amplifier module 202 may provide a transmission signal at a particular power level to the power measurement module 302. The power measurement module 302 may feedback a signal to circuitry that provides the transmit signal to the power amplifier module 202 along feedback path 304. Based on the feedback signal received along the feedback path 304, the circuitry providing power input to the power amplifier module 202 may adjust input power provided to one or more power amplifiers of the power amplifier module 202.

Further, the power measurement module 302 may forward the signal received from the power amplifier module 202 to the antenna switch module 208. In some cases, the antenna switch module 208 may filter or from among a plurality of signals received from the power measurement module 302. The transmit signal may be provided to the antenna 104 for transmission to a base station or another device.

The power measurement module 302 may add to the insertion loss that occurs along the transmission path 300. Thus, in some cases, the power amplifier module 202 may operate at or use more power to compensate for the insertion loss of the power measurement module 302. Further, the power efficiency of the wireless device that includes the transmission signal path 300 may be reduced due to the power measurement module 302.

Figure 3B:
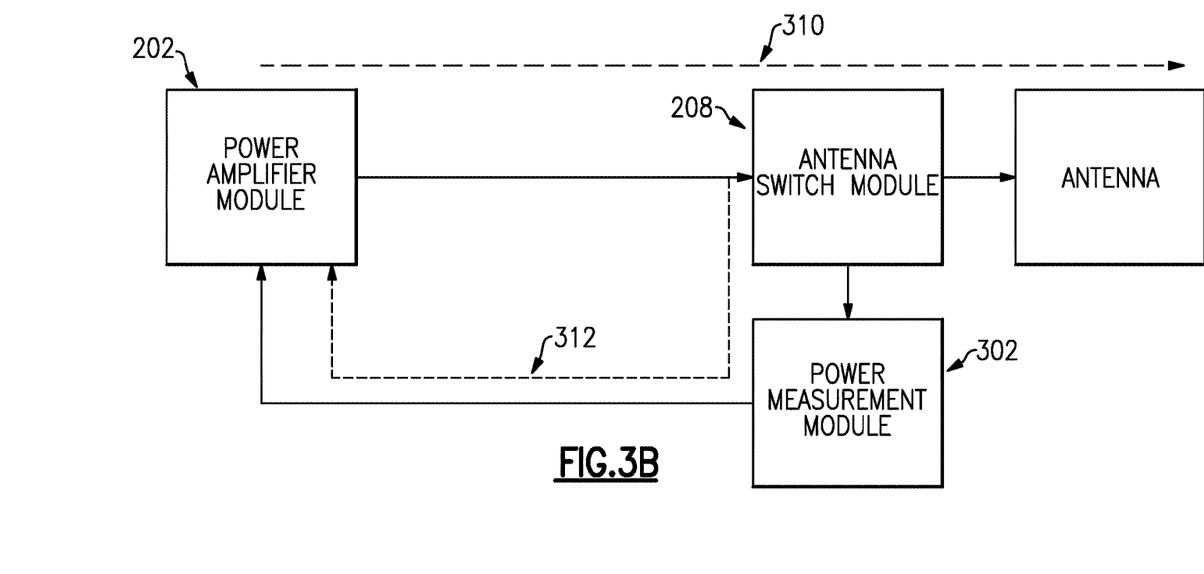
FIG. 3B illustrates another embodiment of a transmitter signal path including the power measurement module.

FIG. 3B illustrates another embodiment of a transmitter signal path including the power measurement module 302. In the embodiment illustrated in FIG. 3B, the power measurement module 302 is removed from the transmitter or main signal path 310 and is instead placed within a coupled path 312. Advantageously, in certain embodiments, by removing the power measurement module 302 from the main signal path 310 insertion loss along the main signal path 310 is reduced compared to the transmit path 300 of FIG. 3A. Further, by reducing the insertion loss along the main signal path 310 power efficiency is improved for the power amplifier module 202 of FIG. 3B compared to that of FIG. 3A.

Although the power measurement module 302 is illustrated as a separate module, in some cases the power measurement module 302 may be part of the antenna switch module 208. However, although the power measurement module 302 may be part of the antenna switch module 208, the power measurement module 302 may still be separate from the main transmit path 310.

Example Circuit Diagrams for a Transceiver

Figure 4A:
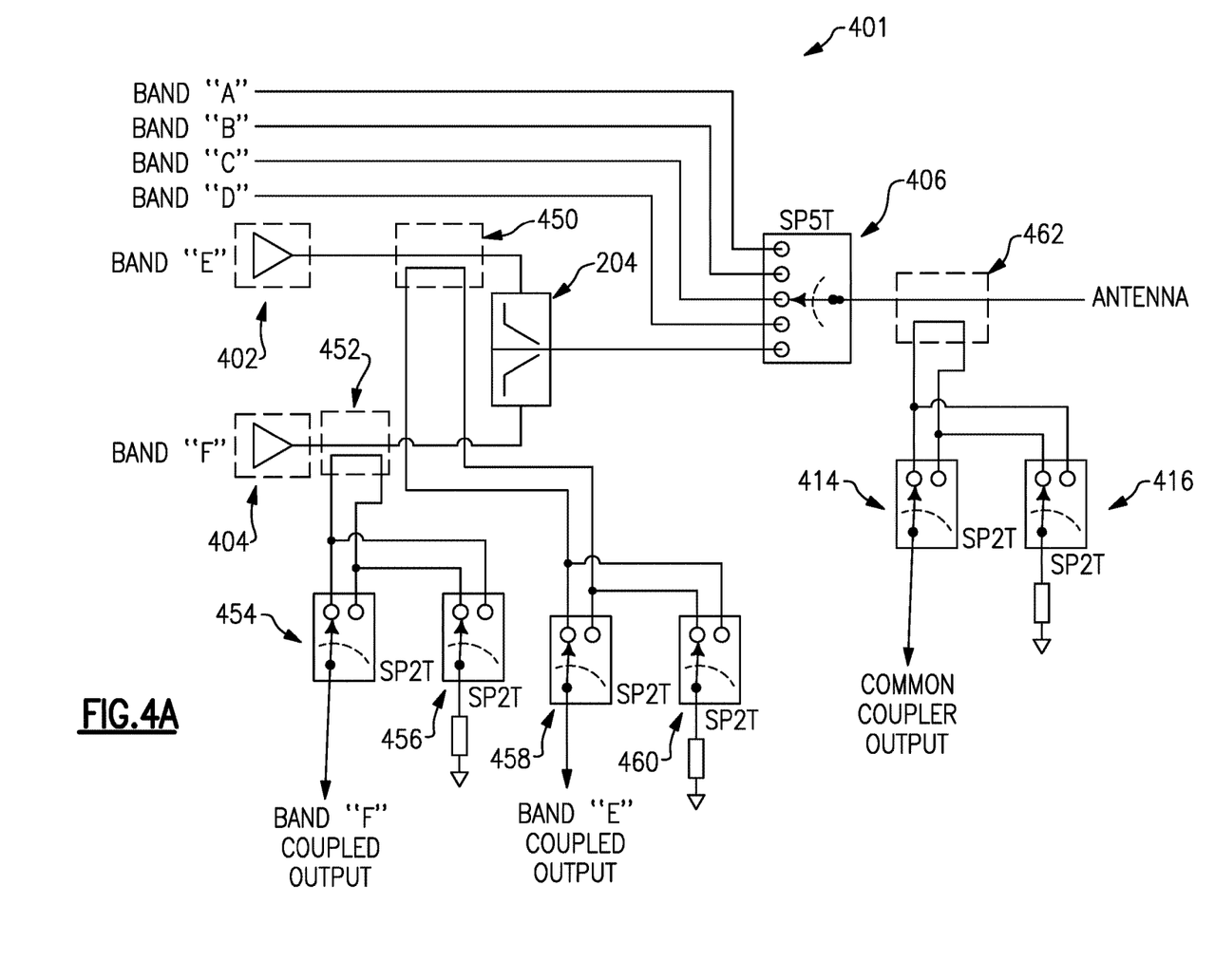
FIG. 4A illustrates a circuit diagram for an embodiment of a first transceiver.

FIG. 4A illustrates a portion of a circuit diagram of a comparison transceiver 401 that, in some embodiments, can be used in place of the transceiver 102 previously described with respect to FIG. 1 and described in more detail below with respect to FIG. 4B. The transceiver 401 includes a power amplifier 402 corresponding to band E and a power amplifier 404 corresponding to band F. To simplify the drawing, the power amplifiers associated with the bands A-D have been omitted. In the illustrated example, bands A-D are not involved in CAUL. Thus, typically, only one of the transmit paths corresponding to bands A-D will be active at a time. On the other hand, the transmit paths for bands E and F are capable of CAUL and may both be active at the same time. Signals associated with bands E and F, which are capable of CAUL, may be combined by a diplexer 204 before being provided to a switch 406.

As illustrated, the switch 406 may be a single pole five throw switch (SP5T). In other words, the switch may include a throw for each transmit path. The position of the switch may be selected based on the communication band or bands that are selected for communication.

The transceiver 401 may further include a coupler 462 that is paired with two switches 414 and 416. The combination of the coupler 462 and the switches 414 and 416 may serve to measure power along the transmit path and to adjust a power amplifier based on the measured power in the transmit path. The power amplifier that is adjusted may be the power amplifier that corresponds to the particular communication band. Thus, for example, if band A is the selected communication band, the measured power along the transmit path may be used to adjust the power supplied to the power amplifier (not shown) associated with the band A communication path.

If the signal being transmitted is a carrier aggregated signal, such as a combined band E and band F signal, the measured power that is measured by the coupler 462 will represent the power of the combined signal. Thus, in some cases, it may be difficult or not possible to determine whether to adjust or how much to adjust the power supplied to the power amplifier 402 associated with band E and the power amplifier 404 associated with band F.

One solution to the above problem is to measure the power of the individual communication bands before they are combined by the diplexer 204. For example, the power of the portion of the carrier aggregated signal associated with band E may be measured by the coupler 450, with the switches 458 and 460 being configured based on whether the forward or reverse power is being measured. Similarly, the power of the portion of the carrier aggregated signal associated with band F may be measured by the coupler 452, with the switches 454 and 456 being configured based on whether the forward or reverse power is being measured.

As illustrated in FIG. 4A, each of the transmit paths corresponding to bands that may be used in carrier aggregated communication (e.g., band E and band F) are associated with a coupler and a pair of switches to facilitate the power measurement of the bands. Although only two bands are illustrated as being eligible for carrier aggregated communication, in some implementations, more than two bands may be eligible for carrier aggregation. For example, in some embodiments, bands C and D may also be eligible for carrier aggregation. Further, there may be any number of combinations of eligible bands that may be used for carrier aggregation. For example, bands D, E, and F may be aggregated in some cases. In other cases, bands C and D may be aggregated, bands D and E may be aggregated, or bands E and F may be aggregated. For wireless devices to support each of these possible carrier aggregations using the solution described in the previous paragraph, each of the transmit lines may include a coupler and a pair of switches as described with respect to the bands E and F of FIG. 4A.

Thus, the more bands that are eligible for carrier aggregation, the more couplers and switches that are included in the transceiver 401. The addition of couplers and switches can result in more cost and a larger transceiver. Further, additional power may be required for the additional switches. Moreover, the additional couplers and switches within the communication paths can add insertion loss in the transmit path causing a reduction in the strength of the transmit signal or requiring greater power to compensate for the insertion loss.

Figure 4B:
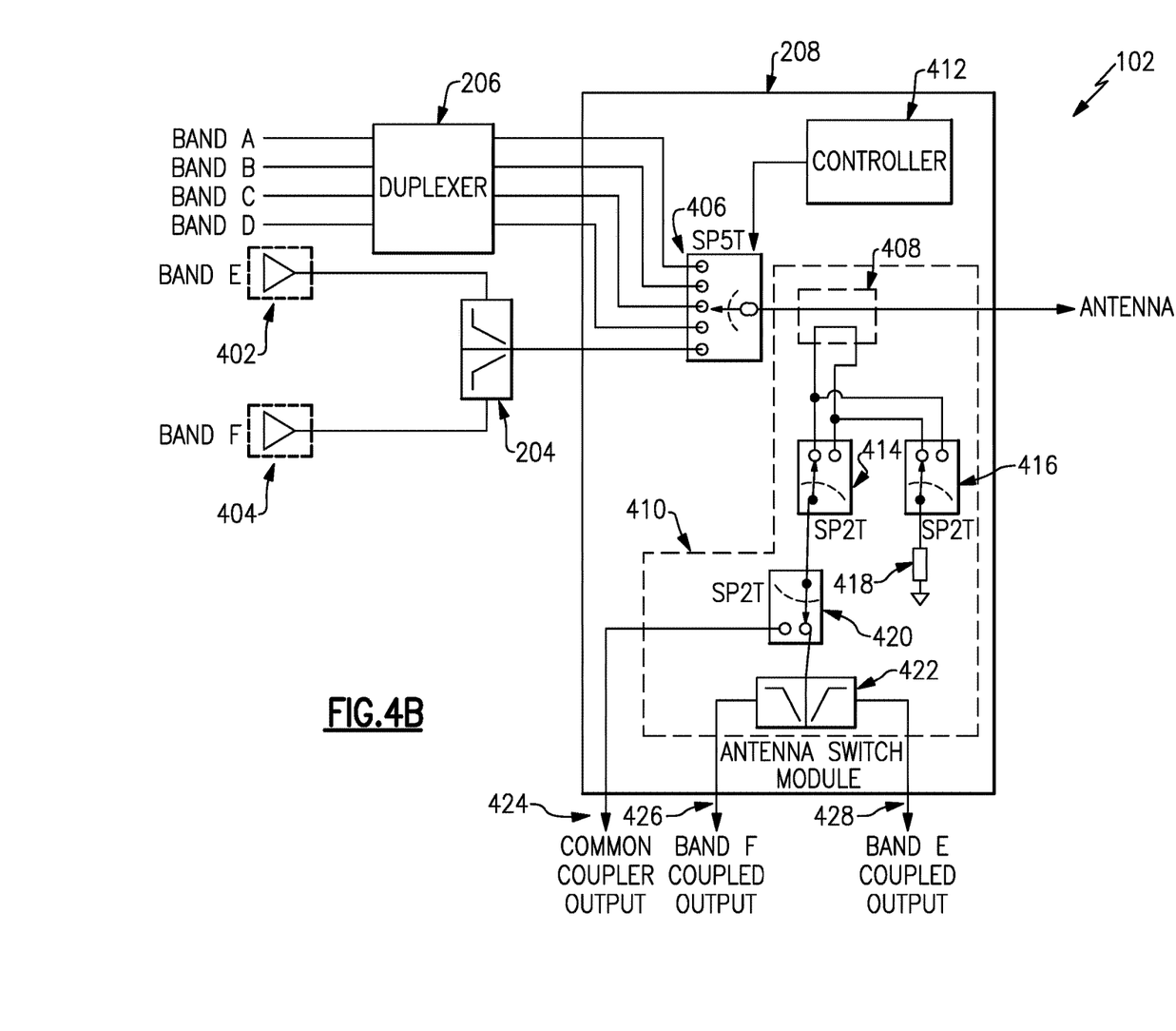
FIG. 4B illustrates a circuit diagram for an embodiment of a second transceiver.

FIG. 4B illustrates a portion of a circuit diagram for an embodiment of a second transceiver 102. In some embodiments, the transceiver 102 reduces the size of the transceiver compared to the transceiver 401, and also reduces insertion loss and the required power of the transceiver 401.

The transceiver 102 includes a power amplifier 402 corresponding to band E and a power amplifier 404 corresponding to band F. To simplify the drawing, the power amplifiers associated with the bands A-D have been omitted. However, it should be understood that each band receives a signal from a power amplifier that may be included as part of the power amplifier module 202 previously discussed. In some cases, some of the bands may share a power amplifier. For example, bands A and B may share a power amplifier. In such cases, a switch may be used to determine the transmit path that is electrically connected to the power amplifier. Alternatively, a single transmit path may be configured to transmit signals of either band A or band B. In some such cases, it may be unnecessary to have multiple transmit paths because only one of band A or band B may communicate at a time if carrier aggregation is not supported for bands A and B.

Each transmit path associated with one of the bands may be in electrical communication with the antenna switch module 208. In the illustrated example, bands A-D are not involved in CAUL. Thus, typically, only one of the transmit paths corresponding to bands A-D will be active at a time. On the other hand, the transmit paths for bands E and F are capable of CAUL and may both be active at the same time. Further, as previously discussed, signals associated with bands E and F that are capable of CAUL may be combined by a diplexer 204 before being provided to the antenna switch module 208.

Although FIG. 4B illustrates two signal bands, band E and band F, being combined for CAUL communication via the diplexer 204, it should be understood that more than two communication bands can be used in CAUL communication. For example, the diplexer 204 may combine three, four, or more communication bands into an aggregated carrier signal. In some embodiments, multiple diplexers may be chained together to create a carrier aggregated signal from multiple frequency bands.

Further, although the transceiver 102 of FIG. 4B only includes one pair of CAUL capable frequency bands, it should be understood that a transceiver may include multiple sets of CAUL capable frequency bands. In other words, multiple pairs of frequency bands may be combined by a diplexer. In some cases, a pair of communication bands may be combined for CAUL communication and a separate set of three communication bands may be combined with a triplexer for CAUL communication. Further, in some cases, a frequency band may be paired with multiple groups of frequency bands for CAUL communication. In such a case, a switch may be used to select the aggregation group that is to include a shared frequency band at a particular point in time. This determination may be based on the RF bands supported by a base station as identified by the base station.

Although more than two frequency bands can be aggregated, increasing the number of aggregated carrier bands can increase the current drain on the wireless device and increase the amount of heat generated. Thus, in certain embodiments, the amount of frequency bands aggregated may be balanced against electrical and physical constraints for a particular wireless device. Moreover, in some cases, the physical location of the aggregated transmit path within the wireless device may be separated from heat sensitive components within the wireless device to counter the increased heat generation from the carrier aggregated transmit path.

Antenna switch module 208 includes a switch 406. As illustrated, the switch 406 may be a single pole five throw switch (SP5T). In other words, the switch may include a throw for each transmit path. Thus, for transceivers that support a different number of communication bands and thus include a different number of transmit paths, the switch 406 may have a different number of throws. Alternatively, in certain embodiments, the switch 406 may be made up of a plurality of switches. At least some of the plurality of switches may be single pole two throw switches (SP2T) or single pole one throw switches (SP1T). In some such embodiments, the controller 412 may select the switch to electrically connect a transmit path to the antenna were may select the switch to close while connecting the other switches to ground or keeping the other switches open.

In the illustrated embodiment with the SP5T, the controller 412 may select the transmit path to electrically connect to the antenna based on a signal received from, for example, the baseband processor 210. Further, the baseband processor 210 may provide a control signal to the controller 412 based on a command received from a base station or other device communicating with the wireless device 100.

The antenna switch module 208 may further include a power measurement module 410. The power measurement module 410 may include a coupler 408 that is configured to sample or otherwise couple a portion of the power of the transmit signal being provided along the main transmit path to the coupled path that includes the remaining components of the power measurement module 410. Typically, the coupler 408 will be a wideband coupler, thereby enabling the coupler to sample or otherwise couple a portion of the power of a number of supported transmit frequency bands. Generally, the coupler 408 will support a greater number of frequency bands than the coupler 462, which may be considered a narrowband coupler, or a coupler that supports fewer frequency bands than the coupler 408. For example, the coupler 408 may be able to process frequencies from bands A, B, C, D, E, and F, while the coupler 462 may not support bands E and F. Advantageously, in certain embodiments, by using the wideband coupler 408, the couplers 450 and 452 can be eliminated. Eliminating the couplers 450 and 452 can reduce the size of the transceiver 102 and reduce required transmit power. The input port of the coupler 408 may receive a signal from the transmit path selected by the controller 412 and electrically connected to the antenna via the switch 406. The output port of the coupler 408 provides the received signal from the transmit path to the antenna for transmission.

The power measurement module 410 may further include a pair of switches 414 and 416 that facilitate measuring the power of the transmit signal and which may be controlled by the controller 412. The switch 414 may select a third port of the coupler 408 to be the coupled port. By adjusting which port from the coupler is the coupled port, the power measurement module 410 can measure one of the forward power being provided to the antenna, or the reflected or reverse power. When the switch 414 is configured such that the pole is to the left in FIG. 4B, the left port of the coupler 408 is electrically connected to the switch 414 and the power measurement module 410 can measure the forward power of the coupler 408. Conversely, when the switch 414 is configured so that the pole is to the right in FIG. 4B, the right port of the coupler 408 is electrically connected to the switch 414 and the power measurement module 410 can measure the reflected power of the coupler 408.

In certain embodiments, the controller 412 may continuously or intermittently adjust the switch 414 to enable the power measurement module 410 to measure the forward power and the reflected power of the coupler 408 continuously or intermittently. For instance, the controller 412 may adjust the switch every 1 ms, every 5 ms, every 5 clock cycles, etc.

The switch 416 may select a port of the coupler 408 to be the isolated or terminated port. When the forward power of the coupler 408 is being measured, the switch 416 terminates the port on the right of the coupler 408. Conversely, when the reflected power of the coupler 408 is being measured, the switch terminates the port on the left of the coupler 408. The switch 416 may terminate a port of the coupler 408 by electrically connecting the coupler port to the termination or the termination resistor 418. The switch 416 may adjust which switch is terminated based on a signal from the controller 412.

The power measurement module 410 may further include a switch 420 that adjusts the output destination of the measured power based on a control signal from the controller 412. The coupler 408 can manage each of the non-carrier aggregated bands (e.g., bands A-D). Thus, if a signal being transmitted is using a communication band that is not used in carrier aggregation, such as one of bands A-D, the switch 420 may electrically connect the measured power from the coupler 408 directly to the output path 424. This output signal may then be directed back to the corresponding PA or to circuitry providing input power for the PA or PAM.

On the other hand, if the signal being transmitted is using one or more communication bands capable of carrier aggregation, the switch 420 may electrically connect the measured power from the coupler 408 to the diplexer 422. This diplexer 422 can split the measured power into its constituent signal bands. Thus, the diplexer 422 can provide a signal that is within frequency band F to the output path 426, which may in turn provide the measured band F power to the power amplifier 404, or a controller that can modify the input power to or configuration of power amplifier 404. Further, the diplexer 422 can provide a signal that is within frequency band E to the output path 428, which may in turn provide the measured band E power to the power amplifier 402, or a controller that can modify the input power to or configuration of power amplifier 402.

Generally, the diplexer 422 is a type of filter or filter network, which may include a number of different filters (e.g., a combination of low-pass and high-pass filters). This filter network can separate the carrier aggregated bands into its constituent frequency bands. For example, a first filter may pass the band E frequency while blocking the band F frequency and a second filter may pass the band F frequency while blocking the band E frequency. Further, in some such cases, the filter network may include a switch that can toggle between the high pass filter and the low pass filter.

In certain embodiments, the band F coupled output 426 provides the signal to a band E frequency detector and the band E coupled output provides the signal to a band F frequency detector. The band E detector can detect and/or filter, using for example a bandpass filter, the portion of the carrier aggregated signal that is within the band E frequency range and provide the band E portion of the signal to the band E PA 402, or its corresponding controller. Similarly, the band F detector can detect and/or filter, using for example a bandpass filter, the portion of the carrier aggregated signal that is within the band F frequency range and provide the band F portion of the signal to the band F PA 404, or its corresponding controller. The filter can successfully separate the signal into its constituent frequency bands because the frequency bands used for carrier aggregation are typically separated in frequency by, for example, a 100 MHz, 200 MHz, etc. In some cases, the frequency bands may be separated by much more than 100 MHz. In some embodiments, the diplexer 422 may be omitted without being replaced by a filter network or alternative system. In such cases, the PA input power associated with the PAs 402 and 404 may be adjusted based on the composite power for the carrier aggregated signal instead of the power for the individual communication bands involved in the CAUL communication.

As previously described, bands E and F are capable of CAUL communication in the transceiver 102 example of FIG. 4B. However, the transceiver 102 may also receive signals in communication bands E and F. Further, in some cases, bands E and F may also transmit signals individually, or in a non-carrier aggregated form. This may occur, for example, when a base station does not support CAUL for bands E and F. Thus, in some cases, the transceiver 102 may be capable of switching between CAUL, separate transmission for bands E and/or F, and receiving signals along bands E and/or F. In some cases, assuming TDD communication, the wireless device 100 may have transmit bursts and receive bursts and each band could have a different duty cycle.

In one non-limiting example, the transceiver 102 could transmit from both bands E and F using CAUL communication for 30% of the time, the transceiver 102 could transmit from frequency band E in a non-carrier aggregation transmit mode 20% while receiving a signal on band F, and can transmit or receive signals on one of bands A-D for 50% of the time. A variety of communication configurations are possible for a TDD system and the selection of bands used for transmitting and/or receiving a signal at a given point of time may be dependent on the base station or the configuration of the wireless device. On the other hand, in some frequency division duplex (FDD) systems, multiple frequency bands may transmit and/or receive signals at the same time. Further, in some embodiments, the power measurement module 410 can measure forward power on one communication path and then measure reverse power on another communication path.

As previously discussed, in some alternative designs, the power measurement module is placed within the transmit path. In some such cases, couplers are placed within each transmit path, or within each transmit path associated with an aggregated frequency band. Such a design may result in greater insertion loss and increased size for the transceiver 102. This insertion loss can increase current drain and degrade the overall performance of the wireless device. Advantageously, by creating a coupled path that is separate from the main transmit paths and by using a wideband coupler at the node between the main transmit path and the coupled path, the number of couplers can be reduced resulting in a smaller and cheaper transceiver compared to designs that include the power measurement within the main transmit path. Further, insertion loss may be reduced in the main transmit path compared to designs that include the power measurement within the main transmit path. Moreover, the number of switches used by the transceiver 102 may be reduced compared to other designs, such as the transceiver 401, resulting in further space and power savings.

In certain embodiments, because the diplexer 204 is within the main transmit path, it can be more important for the diplexer 204 to have a lower insertion loss compared to the diplexer 422, which is in the coupled path and not the main transmit path. Thus, for example, the diplexer 204 may be designed with an insertion loss of 1-2 dB maximum while the diplexer 422 may be designed to accommodate an insertion loss of up to 5 dB. Advantageously, by permitting a higher insertion loss in the diplexer 422, the diplexer 422 may be smaller and cheaper compared to the diplexer 204. Further, the diplexer 422 may be integrated on a single die with other components of the power measurement module 410 or antenna switch module 208. On the other hand, in certain embodiments, the diplexer 204 due, for example, to its insertion loss constraints may be a separate or discrete element and may, in some cases, be a lumped element. In some embodiments, the transceiver 102, or parts thereof, may be part of a front-end module (FEM).

Example Coupler Path Configuration Process

Figure 5:
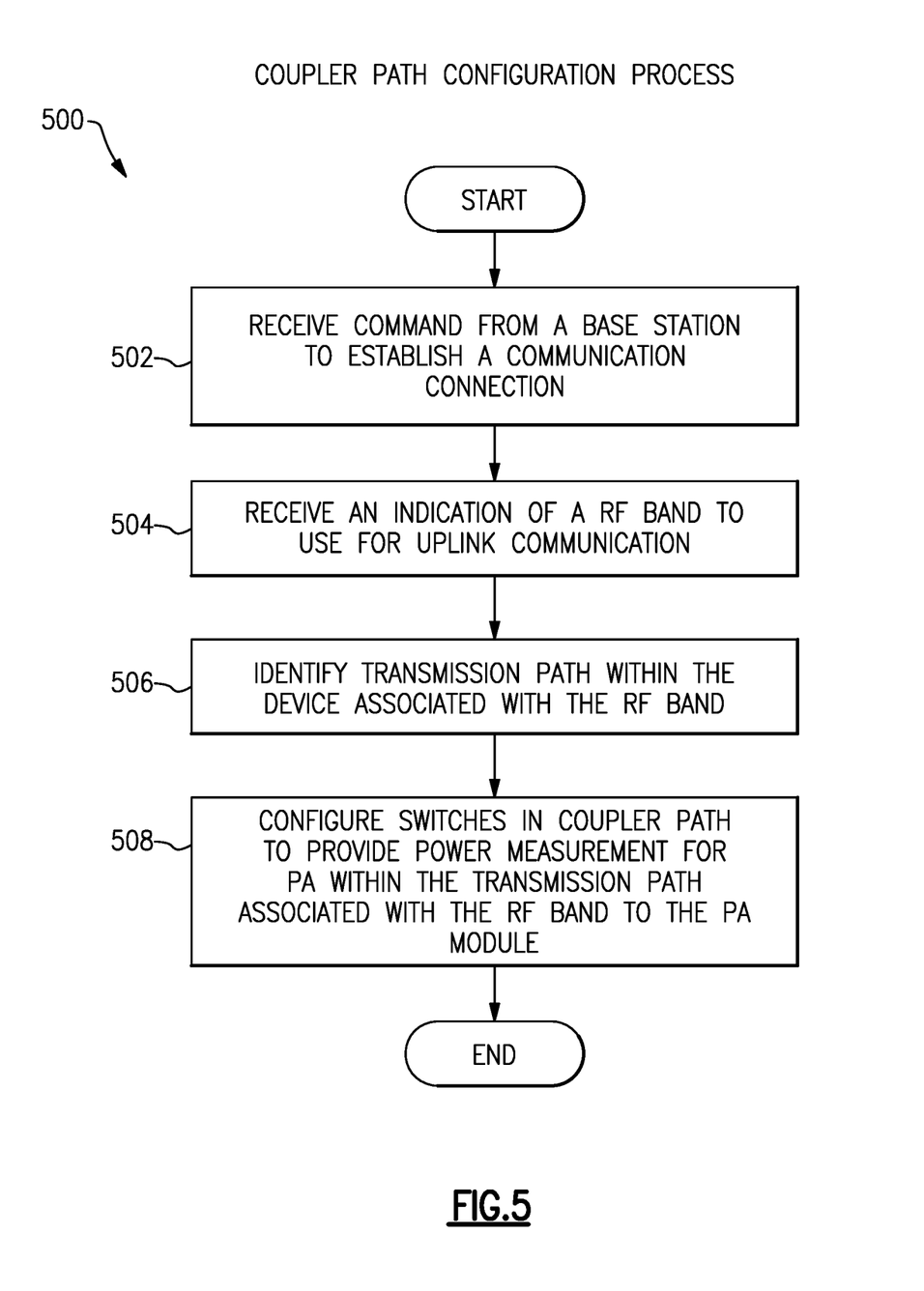
FIG. 5 presents a flowchart of an embodiment of a coupler path configuration process.

FIG. 5 presents a flowchart of an embodiment of a coupler path configuration process 500. The process 500 can be implemented by any system that can configure a coupler or coupled path to measure a forward or reflected power along a transmit or main path. For example, the process 500 may be performed by a controller 412, a power measurement module 410, a baseband processor 210, or a call processor 214, to name a few. Although one or more systems may implement the process 500, in whole or in part, to simplify discussion, the process 500 will be described with respect to particular systems.

The process 500 begins at the block 502 where, for example, the baseband processor 210 receives a command from a base station to establish a communication connection. In some cases, the wireless device that includes the baseband processor 210 may have already established a communication connection with another base station, but may be going through a handover process to switch to the base station because of a change in location by the user of the wireless device. In some cases, the block 502 is omitted because, for example, the wireless device requested to establish the communication connection.

At block 504, the call processor 214 receives an indication of a radio frequency band to use for uplink communication. This indication may come from the base station. In some cases, the call processor 214 may receive an indication of multiple RF bands. For example, if the baseband processor in the wireless device supports carrier aggregation, call processor 214 may receive an indication of multiple RF bands that can be used with carrier aggregation.

At block 506, the call processor 214 identifies a transmission path within the device associated with the RF band identified at the block 504. In some cases, multiple transmission paths may be identified. For example, suppose that the RF bands identified are associated with CAUL transmission. Although the portion of the transmit path may be combined, as illustrated in FIG. 4B, at least some of the transmit paths (e.g., the portion between the PAs 402, 404 and the diplexer 204) for the CAUL bands may be separate. Thus, in such cases, multiple transmission paths, or portions thereof, may be identified when multiple RFG bands are identified at the block 504.

The call processor 214, at block 508, configures switches within the coupler path of the transceiver 102 to provide a power measurement for a power amplifier within the transmission path associated with the RF band to the power amplifier module 202. In some cases, the call processor 214 may configure the switches within the coupler path by providing a one or more control signals to the controller 412 of the transceiver 102. In some embodiments, the process 500 may further include receiving a control signal to determine whether to provide a measurement of forward power or reflected power to the power amplifier module. The block 508 may also include adjusting or controlling the switch 406 to select the transmit path corresponding to the communication band(s) requested by, for example, the base station.

In certain embodiments, at least parts of the process 500 may be performed continuously or intermittently. For example, the base station may periodically send messages to the call processor 214 instructing the wireless device to adjust its power output. In such cases, the operations associated with the block 508 may be repeated as the power level in the power amplifier corresponding to the transmit band is adjusted. Further, the base station may request that the wireless device change its transmission band or switch to/from carrier aggregation transmission. In such cases, the operations associated with the block 506 may be repeated to determine the new transmission path associated with the requested RF band(s).

Second Example Wireless Device

Figure 6:
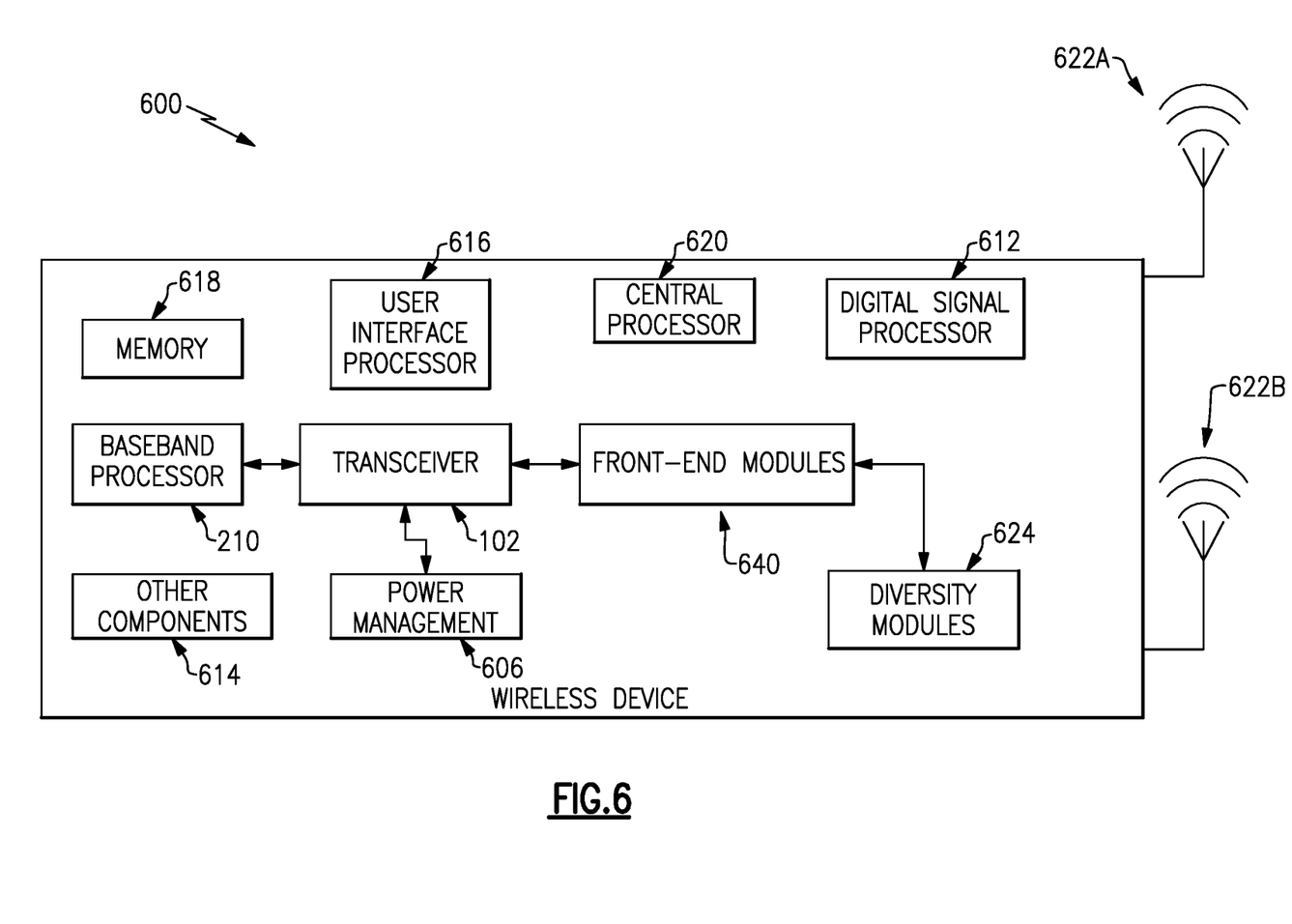
FIG. 6 illustrates a block diagram of an embodiment of a wireless device.

FIG. 6 illustrates a block diagram of an embodiment of a wireless device 600. The wireless device 600 is a more detailed version of the wireless device 100 and may include some or all of the embodiments previously described with respect to the wireless device 100.

In the example illustrated in FIG. 6, the wireless device may include a number of front-end module (FEMs) 640. In some cases, a different FEM may be included for different communication standards or technologies (e.g., 2G, 3G, 4G LTE, 5G, etc.). Further, although illustrated separately, in some cases, an FEM 640 may include the transceiver 102.

Other connections between the various components of the wireless device 600 are possible, and are omitted from FIG. 6 for clarity of illustration only and not to limit the disclosure. For example, the power management component 606 may be electrically connected to the baseband processor 210, the FEMs 640, the DSP 612, or other components 614. As a second example, the baseband processor 210 may be connected to a user interface processor 616 that may facilitate input and output of voice and/or data provided to and received from the user. The baseband processor 210 can also be connected to a memory 618 that may be configured to store data and/or instructions to facilitate the operation of the wireless device 600, and/or to provide storage of information for the user.

In addition to the aforementioned components, the wireless device may include one or more central processors 620. Each central processor 620 may include one or more processor cores. Further, the wireless device 600 may include one or more antennas 622A, 622B. In some cases, one or more of the antennas of the wireless device 600 may be configured to transmit and receive at different frequencies or within different frequency ranges. Further, one or more of the antennas may be configured to work with different wireless networks. Thus, for example, the antenna 622A may be configured to transmit and receive signals over a 2G network, and the antenna 622B may be configured to transmit and receive signals over a 3G network. In some cases, the antennas 622A and 622B may both be configured to transmit and receive signals over, for example, a 2.5G network, but at different frequencies. Moreover, one of the antennas 622A or 622B may be a diversity antenna, which may communicate with a diversity module 624.

A number of other wireless device configurations can utilize one or more features described herein. For example, a wireless device can include additional antennas such as diversity antenna, and additional connectivity features such as Wi-Fi, Bluetooth, and GPS. Further, the wireless device 600 may include any number of additional components, such as analog to digital converters, digital to analog converters, graphics processing units, solid state drives, etc. Moreover, the wireless device 600 can include any type of device that may communicate over one or more wireless networks using CAUL communication. For example, the wireless device 600 may be a cellular phone, including a smartphone or a dumbphone, a tablet, a laptop, a video game device, a smart appliance, etc.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The term "coupled" is used to refer to the connection between two elements, the term refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the inventions are not intended to be exhaustive or to limit the inventions to the precise form disclosed above. While specific embodiments of, and examples for, the inventions are described above for illustrative purposes, various equivalent modifications are possible within the scope of the inventions, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the inventions provided herein can be applied to other systems, not necessarily the system described above. The elements and acts of the various embodiments described above can be combined to provide further embodiments.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A power measurement module of a radio frequency device comprising:
   a wideband coupler configured to provide a transmit signal from a band selection switch to an antenna, the band selection switch in communication with a first diplexer via a transmit path supporting carrier aggregation transmission of a first radio frequency band and a second radio frequency band, the first diplexer in communication with a first power amplifier corresponding to the first radio frequency band and in communication with a second power amplifier corresponding to the second radio frequency band; and
   a filter module in communication with the wideband coupler and configured to receive a sample of a carrier aggregated signal from the wideband coupler, the filter module including a second diplexer configured to split the sample of the carrier aggregated signal into a first measurement signal corresponding to the first radio frequency band and a second measurement signal corresponding to the second radio frequency band, and the filter module further configured to output the first measurement signal and the second measurement signal to a controller configured to modify the configuration of the first power amplifier based on the first measurement signal or the second power amplifier based on the second measurement signal.

2. The power measurement module of claim 1 wherein the filter module includes a plurality of filters, a first filter of the plurality of filters configured to pass the first radio frequency band and block the second radio frequency band, and a second filter of the plurality of filters configured to pass the second radio frequency band and block the first radio frequency band.

3. The power measurement module of claim 1 further comprising a switch configured to switch between connecting a port of the wideband coupler to the filter module or to a common coupler output.

4. The power measurement module of claim 3 wherein the common coupler output corresponds to a power measurement for a third radio frequency band, the third radio frequency band not used for carrier aggregation transmission.

5. The power measurement module of claim 3 wherein the filter module includes a low pass filter and a high pass filter, the switch being a single pole three throw switch, a first throw configured to connect a port of the wideband coupler to the low pass filter, a second throw configured to connect the port of the wideband coupler to the high pass filter, and a third throw configured to connect the port of the wideband coupler to the common coupler output without a filter.

6. The power measurement module of claim 1 wherein the power measurement module is part of a coupled path that is separate from the transmit path.

7. The power measurement module of claim 1 wherein the wideband coupler comprises a single wideband coupler that substitutes for a plurality of narrowband couplers.

8. A radio frequency device comprising:
a transmit switch in communication with a first diplexer via a transmit path supporting carrier aggregation transmission of a first radio frequency band and a second radio frequency band, the first diplexer in communication with a first power amplifier corresponding to the first radio frequency band and a second power amplifier corresponding to the second radio frequency band; and
a power measurement module including a wideband coupler and a filter module, the wideband coupler configured to provide a transmit signal from the transmit switch to an antenna, the filter module in communication with the wideband coupler and configured to receive a sample of a carrier aggregated signal from the wideband coupler, the filter module including a second diplexer configured to split the sample of the carrier aggregated signal into a first measurement signal corresponding to the first radio frequency band and a second measurement signal corresponding to the second radio frequency band, the filter module further configured to output the first measurement signal and the second measurement signal to a controller configured to modify the configuration of the first power amplifier based on the first measurement signal or the second power amplifier based on the second measurement signal.

9. The radio frequency device of claim 8 wherein the power measurement module does not contribute to an insertion loss within the transmit path.

10. The radio frequency device of claim 8 wherein the filter module includes a plurality of filters, a first filter of the plurality of filters configured to pass the first radio frequency band and block the second radio frequency band, and a second filter of the plurality of filters configured to pass the second radio frequency band and block the first radio frequency band.

11. The radio frequency device of claim 8 further comprising a switch configured to switch between connecting a port of the wideband coupler to the filter module or to a common coupler output.

12. The radio frequency device of claim 11 wherein the common coupler output corresponds to a power measurement for a third radio frequency band, the third radio frequency band not used for carrier aggregation transmission.

13. The radio frequency device of claim 11 wherein the filter module includes a low pass filter and a high pass filter, the switch being a single pole three throw switch, a first throw configured to connect a port of the wideband coupler the low pass filter, a second throw configured to connect the port of the wideband coupler to the high pass filter, and a third throw configured to connect the port of the wideband coupler to the common coupler output without a filter.

14. The radio frequency device of claim 8 wherein the power measurement module is part of a coupled path that is separate from the transmit path.

15. A transceiver comprising:
a power amplifier module including a plurality of power amplifiers in communication with a first diplexer, the plurality of power amplifiers including a first power amplifier corresponding to a first radio frequency band and a second power amplifier corresponding to a second radio frequency band, the first diplexer configured to output a carrier aggregated signal from at least the first radio frequency band and the second radio frequency band;
a band selection switch configured to receive the carrier aggregated signal from the first diplexer; and
a power measurement module including a wideband coupler and a filter module, the wideband coupler configured to provide the carrier aggregated signal from the band selection switch to an antenna, the filter module in communication with the wideband coupler and further configured to receive a sample of the carrier aggregated signal from the wideband coupler, the filter module including a second diplexer configured to split the sample of the carrier aggregated signal into a first measurement signal corresponding to the first radio frequency band and a second measurement signal corresponding to the second radio frequency band, and the filter module further configured to output the first measurement signal and the second measurement signal to a controller configured to modify the configuration of the first power amplifier based on the first measurement signal or the second power amplifier based on the second measurement signal.

16. The transceiver of claim 15 wherein the power measurement module includes a plurality of switches configured to regulate providing a power measurement from the wideband coupler to at least one of the plurality of power amplifiers.

17. The transceiver of claim 16 wherein the power measurement corresponds to at least one of an output power at the antenna or a reflected power from the antenna.

18. The transceiver of claim 15 wherein the first diplexer is configured to multiplex a first signal corresponding to the first radio frequency band and a second signal corresponding to the second radio frequency band.

19. The transceiver of claim 15 wherein the power amplifier module is configured to modify an input power to at least one of the first power amplifier or the second power amplifier based at least in part on a power measurement signal from the power measurement module.

20. The transceiver of claim 15 wherein the filter module includes a plurality of filters, a first filter of the plurality of filters configured to pass the first radio frequency band and block the second radio frequency band, a second filter of the plurality of filters configured to pass the second radio frequency band and block the first radio frequency band.

* * * * *